United States Patent
Cassens et al.

(10) Patent No.: US 9,565,849 B1
(45) Date of Patent: Feb. 14, 2017

(54) RODENT TRAP

(71) Applicants: David A. Cassens, Michael, IL (US); Mark D. McMurray, Godfrey, IL (US)

(72) Inventors: David A. Cassens, Michael, IL (US); Mark D. McMurray, Godfrey, IL (US)

(73) Assignee: CasMac Innovations, Inc., Grafton, IL (US)

( * ) Notice: Subject to any disclaimer, the term of this patent is extended or adjusted under 35 U.S.C. 154(b) by 268 days.

(21) Appl. No.: 14/159,628

(22) Filed: Jan. 21, 2014

Related U.S. Application Data

(60) Provisional application No. 61/755,536, filed on Jan. 23, 2013.

(51) Int. Cl.
*A01M 23/00* (2006.01)
*A01M 23/08* (2006.01)

(52) U.S. Cl.
CPC .................................. *A01M 23/08* (2013.01)

(58) Field of Classification Search
CPC ............................ A01M 23/02; A01M 23/08
USPC ...... 43/58, 60, 64–66, 67, 121, 55, 100, 105
See application file for complete search history.

(56) References Cited

U.S. PATENT DOCUMENTS

| | | | |
|---|---|---|---|
| 710,020 A | 9/1902 | Short | |
| 1,040,329 A * | 10/1912 | Holt | A01M 21/00 43/65 |
| 1,415,801 A * | 5/1922 | Corle | A01M 23/00 43/65 |
| 1,845,819 A * | 2/1932 | Starorypinski | A01M 23/02 43/65 |
| 1,931,175 A | 10/1933 | Zabel | |
| 2,123,471 A * | 7/1938 | Lewis | A01M 23/00 43/100 |
| 2,162,623 A | 6/1939 | Livingston | |
| 2,573,352 A * | 10/1951 | Nicodemus | A01K 97/20 43/55 |
| 3,605,320 A | 9/1971 | Wells | |
| 3,855,727 A * | 12/1974 | Canoy | A01M 1/02 43/100 |
| 4,825,577 A * | 5/1989 | Brannon | A01K 97/04 43/55 |
| 4,829,704 A | 5/1989 | Richardson | |
| 4,989,362 A * | 2/1991 | Joyner | A01K 97/04 43/55 |
| 5,406,741 A | 4/1995 | Little | |
| 5,615,514 A * | 4/1997 | Meade, Jr. | A01M 23/20 43/61 |
| 5,782,034 A | 7/1998 | Robin | |
| 6,158,165 A | 12/2000 | Wilson | |
| 6,212,819 B1 | 4/2001 | Edwards | |
| 7,222,453 B2 | 5/2007 | Uhl | |

(Continued)

*Primary Examiner* — Danielle Clerkley
(74) *Attorney, Agent, or Firm* — CreatiVenture Law, LLC; Dennis JM Donahue, III

(57) ABSTRACT

A rodent trap is provided including a base having a release door formed therein to release rodents from the trap. A bait tray is provided having a cavity for retaining bait. The bait tray is removably attached to the base. The release door is sealed when the bait tray is attached to the base. The release door is opened when the bait tray is removed from the base. A top is provided having a tube with a tube opening extending therethrough. The tube opening sized to receive a rodent therethrough. A wire body extends between the top and the base.

20 Claims, 29 Drawing Sheets

(56) References Cited

U.S. PATENT DOCUMENTS 7,412,797 B1 * 8/2008 Hiscox .................... A01M 1/02
                                              43/107
8,402,690 B2 * 3/2013 Schneidmiller ....... A01M 1/023
                                              43/121

* cited by examiner

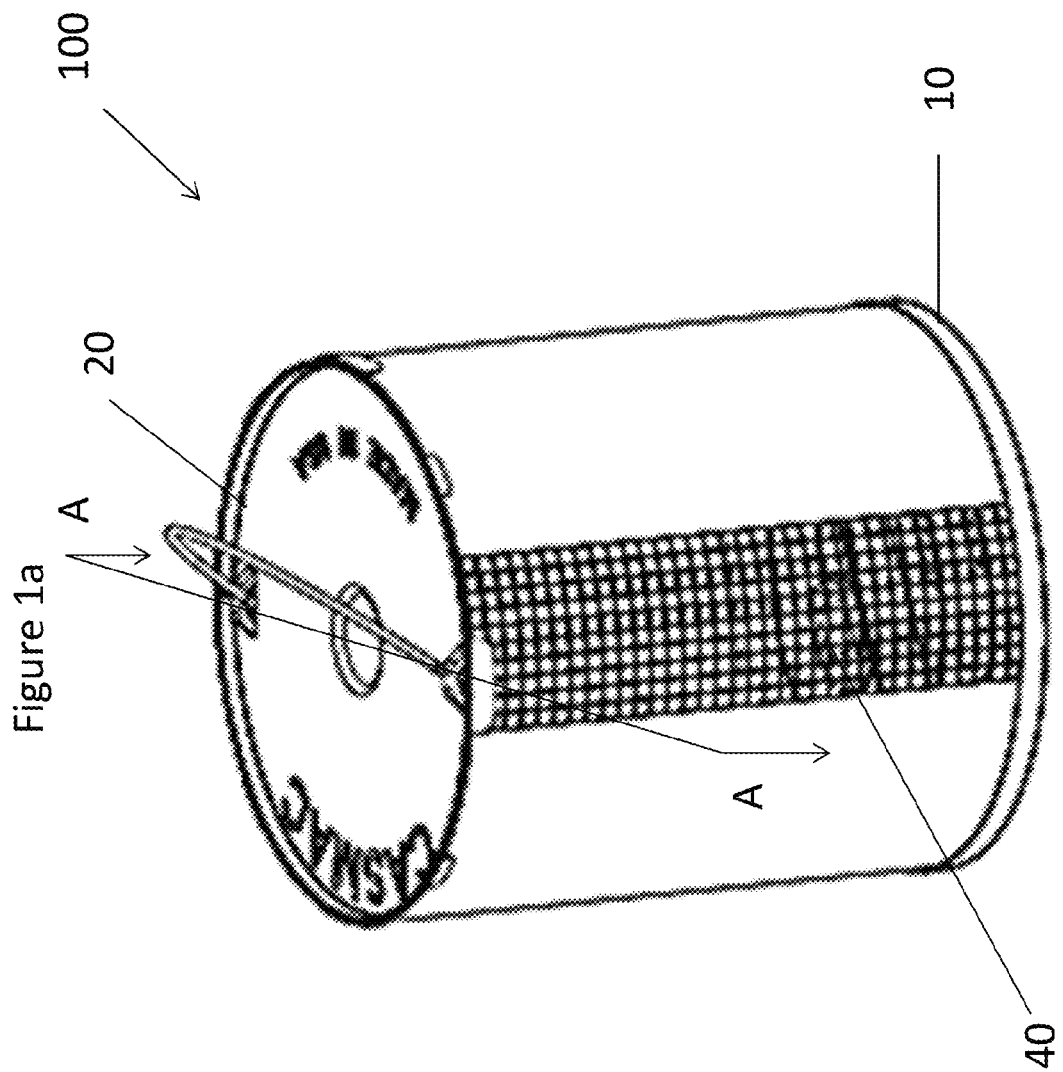

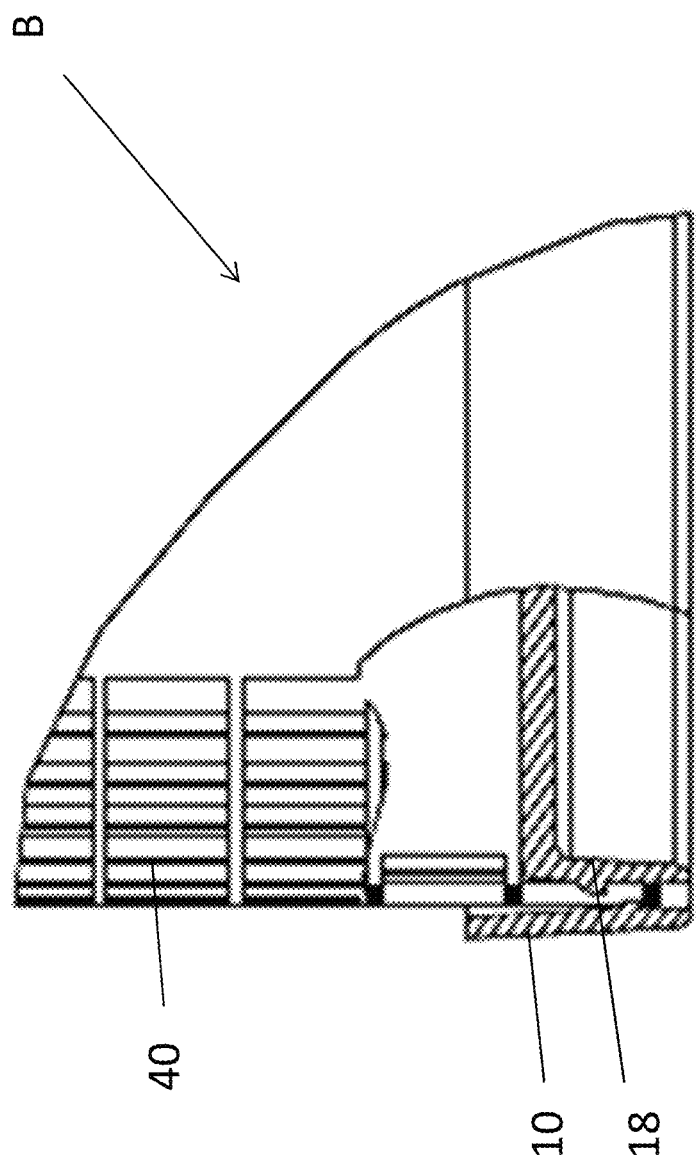

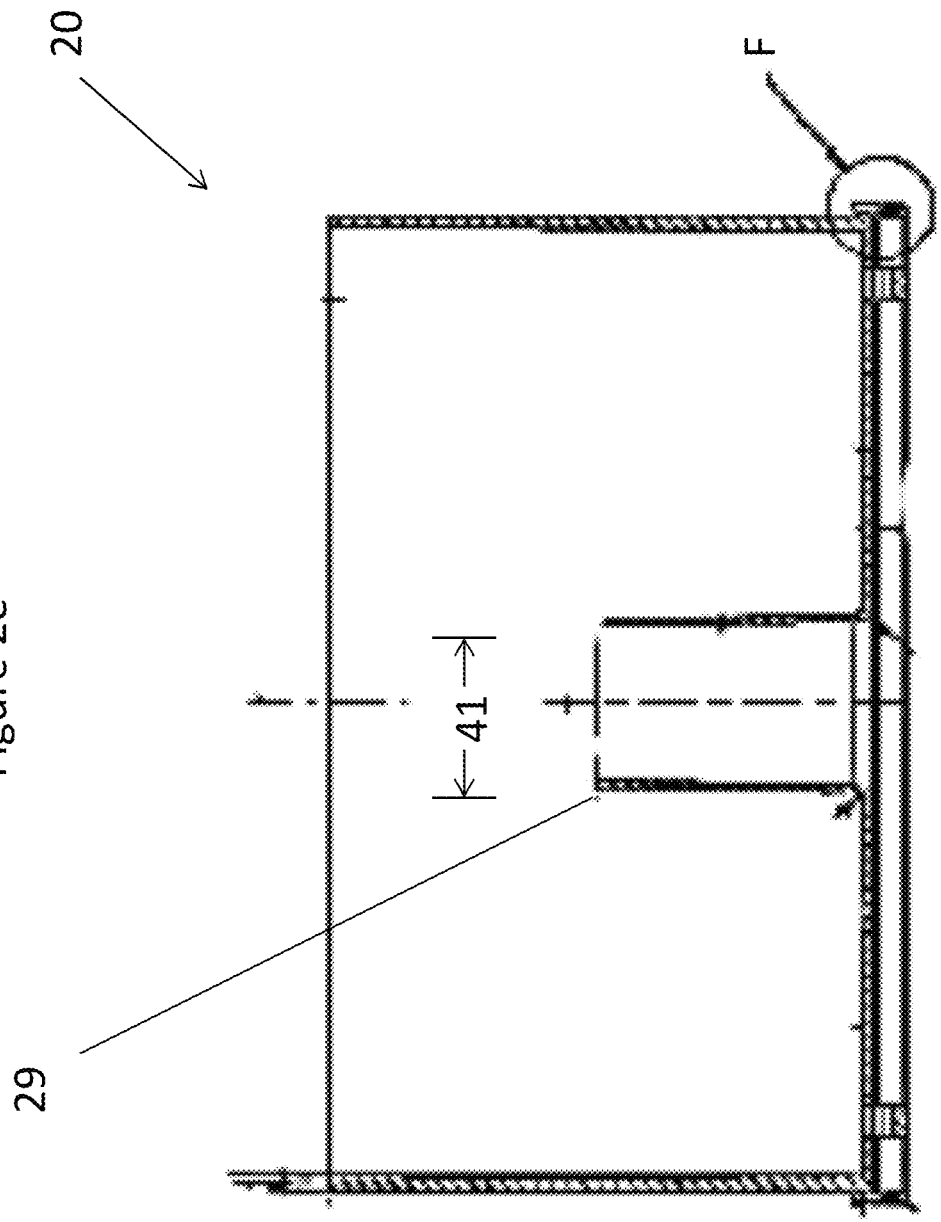

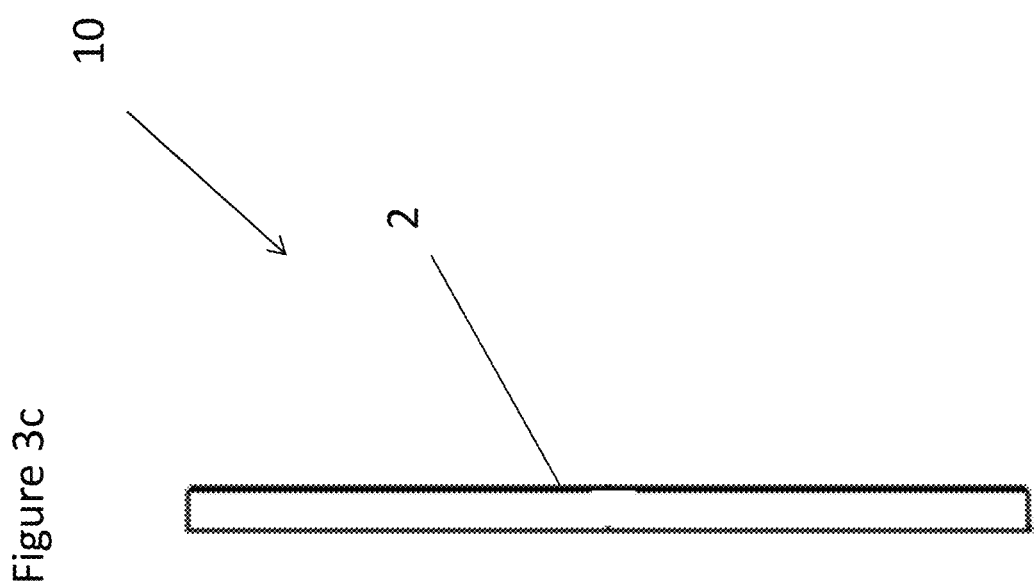

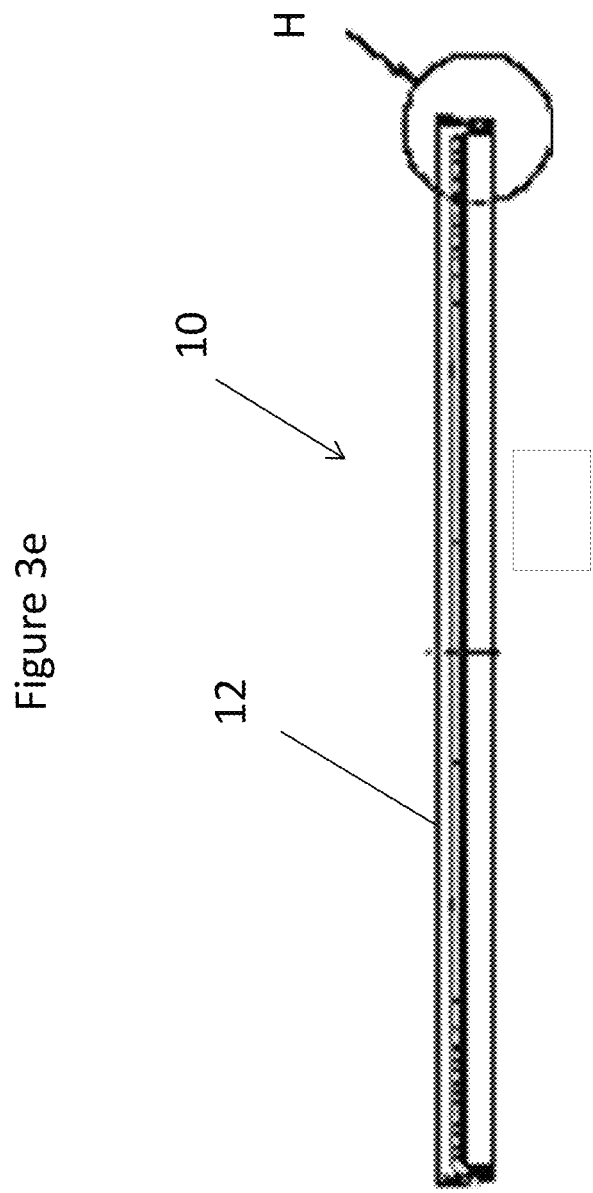

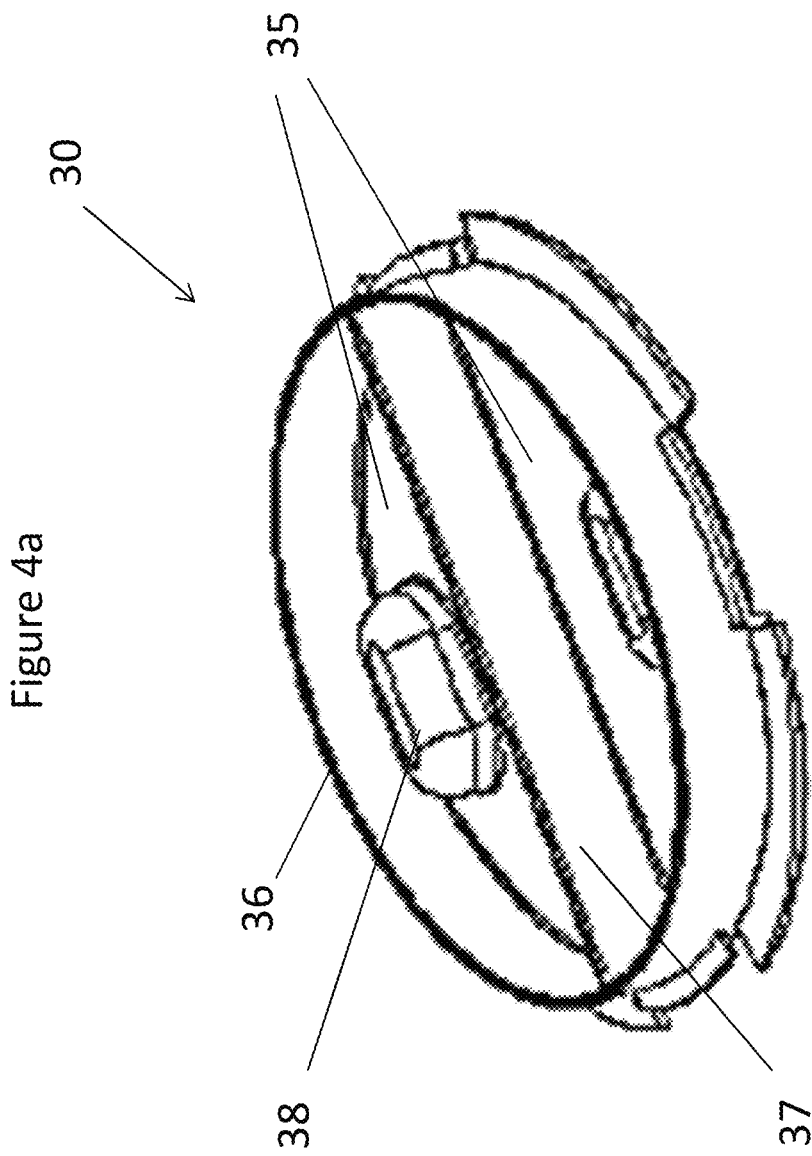

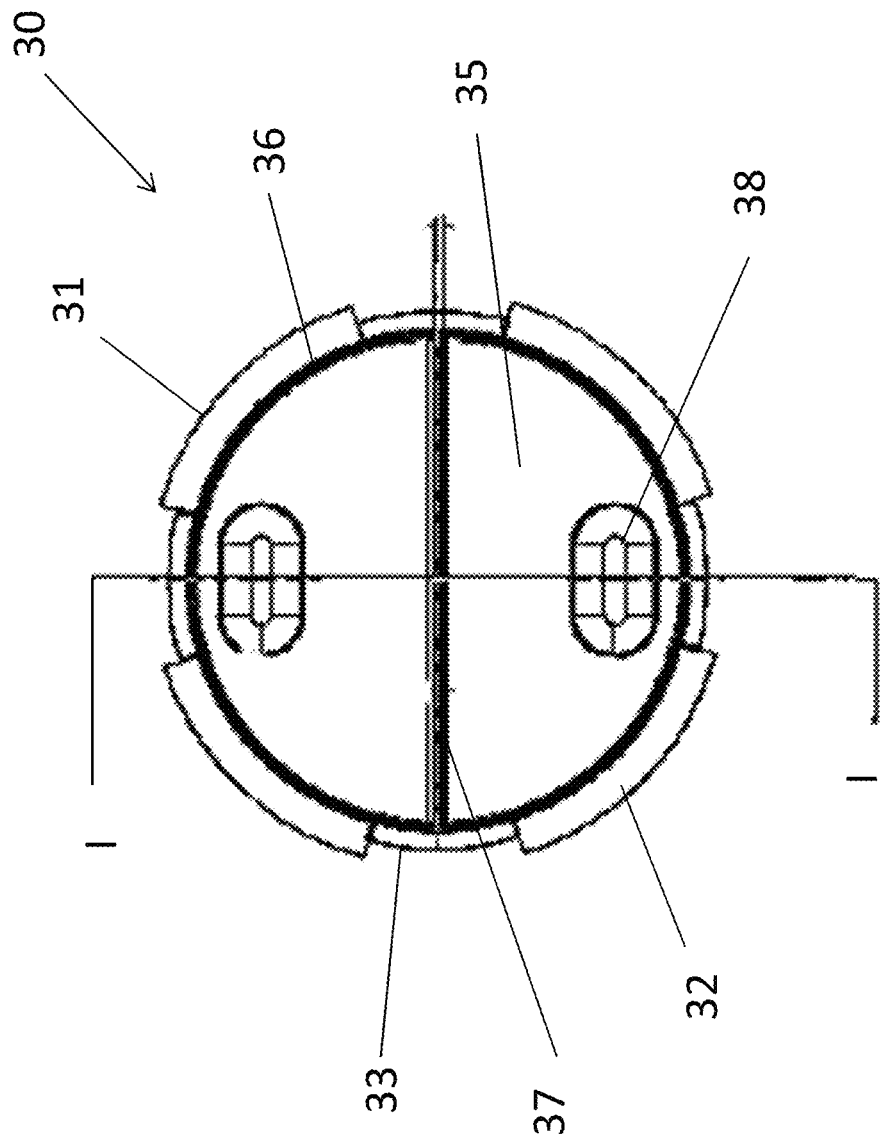

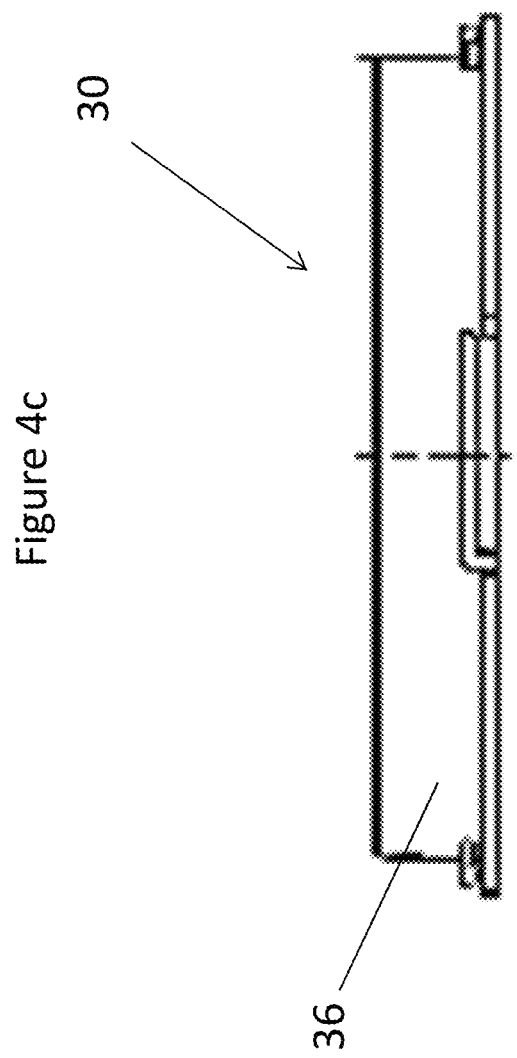

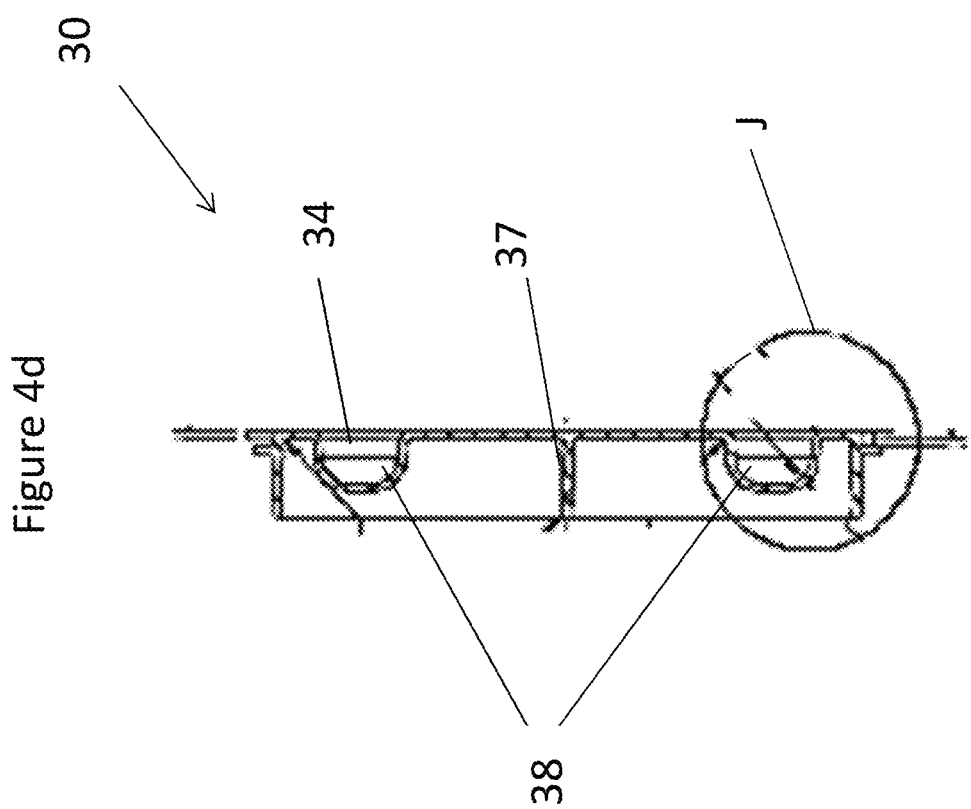

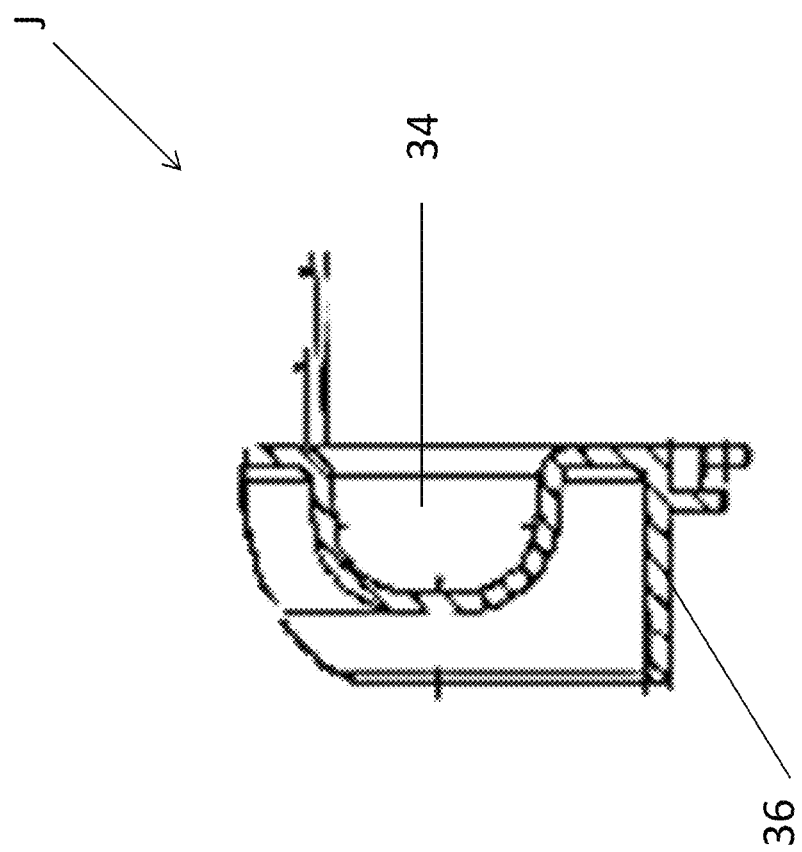

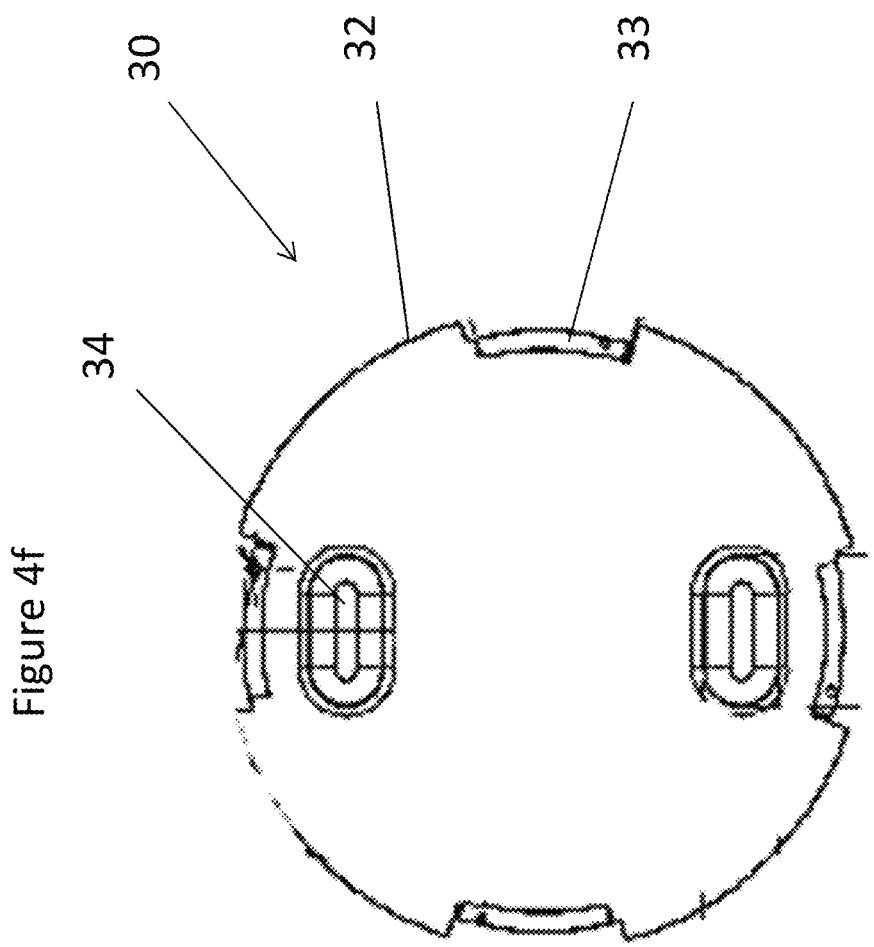

RODENT TRAP

CROSS-REFERENCE TO RELATED APPLICATIONS

This application claims priority from U.S. Provisional Patent Application No. 61/755,536 filed Jan. 23, 2013 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a rodent trap, and more particularly to a rodent trap having no movable parts and a cavity for retaining bait.

Related Art

Rodent traps are well known for catching rodents and releasing them into the wild. However, many rodent traps include a plurality of movable parts that cause the trap to break or malfunction over time. Additionally, many rodent traps are incapable of keeping the rodent alive long enough to release the rodent into the wild. In particular, bait placed within known rodent traps may not be sufficient to keep the rodent alive for several days. When extra bait is placed within a known trap, the bait is often scattered throughout the trap or even blown from the trap in windy conditions. As such, the bait is not effective in attracting rodents and the bait is not sufficient to maintain the life of the rodent over several days.

Very often peanut butter is used to bait a mouse trap. However, for live catch and release of mice, peanut butter without water actually dehydrates and kills mice. A different form of bait and water is needed to sustain a mouse for several days. Many devices have spaces where a cup or container of water can sit. However, a frantic trapped rodent will tip or spill that container and subsequently not have water to drink. The present invention has integrated containers to hold water and food, and these integrated containers cannot be spilled by the trapped rodent.

Another drawback of known traps is that the rodent may be capable of escaping the trap. For example, if a movable part in the trap malfunctions when the rodent is caught, the rodent may be able to easily escape the trap through the trap door. Moreover, some rodents are capable of jumping to such heights that the rodent may be able to climb out of the trap door. Additionally, many wire mesh traps allow the rodent to climb out of the trap or chew through a corner of the trap and escape.

A need remains for a rodent trap that can catch multiple rodents and keep them alive for several days. Another need remains for a trap that does not include movable parts to capture the rodent. By removing the movable parts from the trap, the trap is not subject to malfunctioning and allowing the rodent to escape.

Prior known rodent traps include U.S. Pat. No. 710,020 which discloses a wire cage with a plate metal top and bottom. The top has a funnel opening with bait displayed below it to entice the mouse into the cage. U.S. Pat. No. 1,040,329 discloses a mouse trap with a domed wire mesh cover over a metal sheet bottom, with a metal tube extending down from the dome into the cage. The tube is moveably attached to swing from the top of the cage, so the mouse cannot find purchase to climb out. U.S. Pat. No. 2,162,623 discloses a rectangular wire cage with a horizontal conical tunnel that terminates with prongs pointing inward to prevent the rodent from exiting the cage via the tunnel after climbing in. U.S. Pat. No. 3,605,320 discloses a wire crab cage with a conical downward sloping opening to prevent crabs from escaping. U.S. Pat. No. 5,406,741 discloses a conically shaped mousetrap with an opening at the top of the container and a liquid at the bottom to drown the entrapped mouse. U.S. Pat. No. 1,931,175 discloses an inverted cup shaped wire mesh cage with an aperture on top through which a rodent falls onto a wire plate and is electrocuted. None of the above discloses a bait tray having integrated cavities for feeding and drinking in the bottom, or a release door on the bottom that is opened when the bait tray is removed.

SUMMARY OF THE INVENTION

A rodent trap is provided having a base with at least one cavity formed therein for retaining bait. The at least one cavity is formed in a bait tray that is removable from the base. A release door is formed in the base to release the rodent from the trap. The release door is sealed when the bait tray is attached to the base. The release door is opened when the bait tray is removed from the base. The trap also includes a top having a tube with a tube opening extending therethrough. The top is formed from a solid material. The tube opening is sized to receive a rodent therethrough. The tube extends from the top of the trap to a tube end positioned within the trap. The tube end is spaced above the base to prevent the rodent from escaping from the trap through the tube. A wire body extends between the top and the base. The wire body is formed as a flat wire mesh that is rolled into a cylindrical tube to form the wire body. The top and the base include catches. The wire mesh is snapped into the catches to form the rodent trap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a illustrates a side perspective schematic view of a rodent trap formed in accordance with an embodiment.

FIG. 1d provides an exploded view of a catch formed in the rodent trap.

FIG. 2e provides a side cross-sectional (section C-C) view of the rodent trap.

FIG. 3c provides a side view of the base of the rodent trap.

FIG. 3e provides a side cross-sectional (section G-G) view of the base of the rodent trap.

FIG. 4a illustrates a top perspective schematic view of a bait tray of the rodent trap.

FIG. 4b provides a top view of the bait tray of the rodent trap.

FIG. 4c provides a side view of the bait tray of the rodent trap.

FIG. 4d provides a side cross-sectional (section I-I) view of the bait tray of the rodent trap.

FIG. 4e provides an exploded view of a finger grip formed in the bait tray of the rodent trap.

FIG. 4f provides a bottom view of the bait tray of the rodent trap.

DETAILED DESCRIPTION OF THE PREFERRED EMBODIMENTS

Figure 1B:
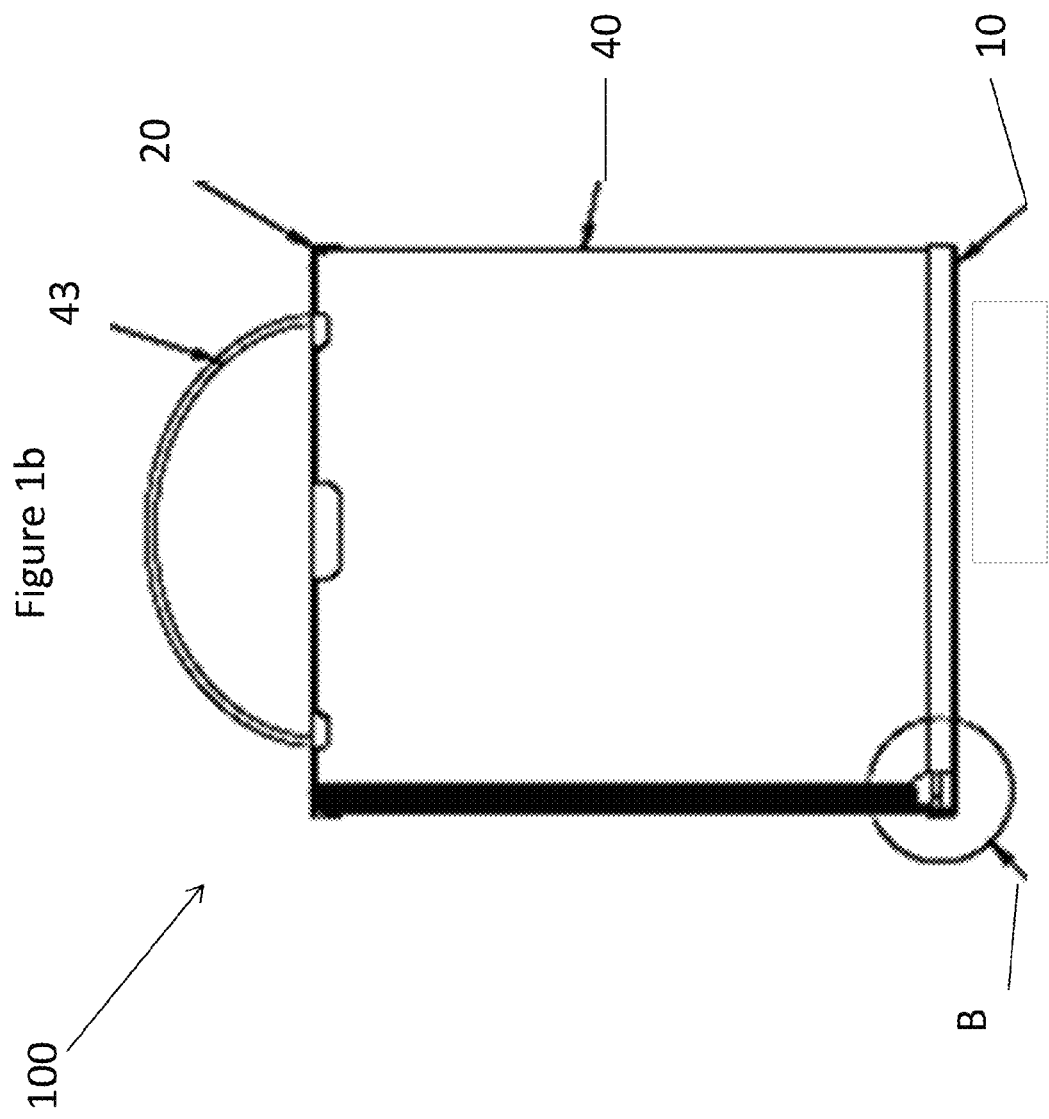
FIG. 1b illustrates a side cross-sectional (section A-A) view of the rodent trap.
Figure 1C:
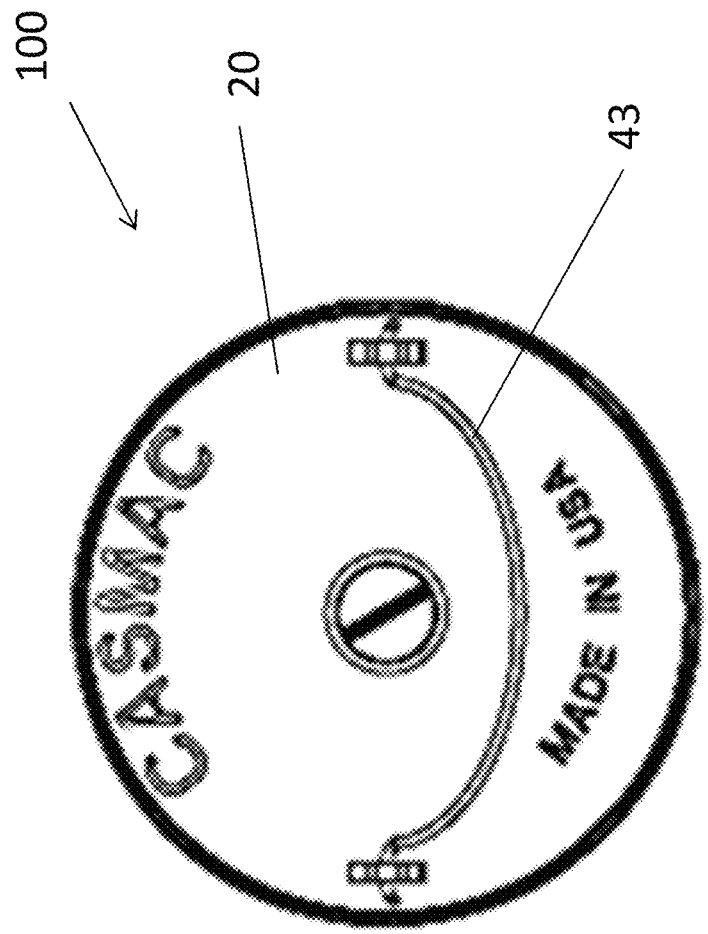
FIG. 1c provides a top view of the rodent trap.
Figure 2A:
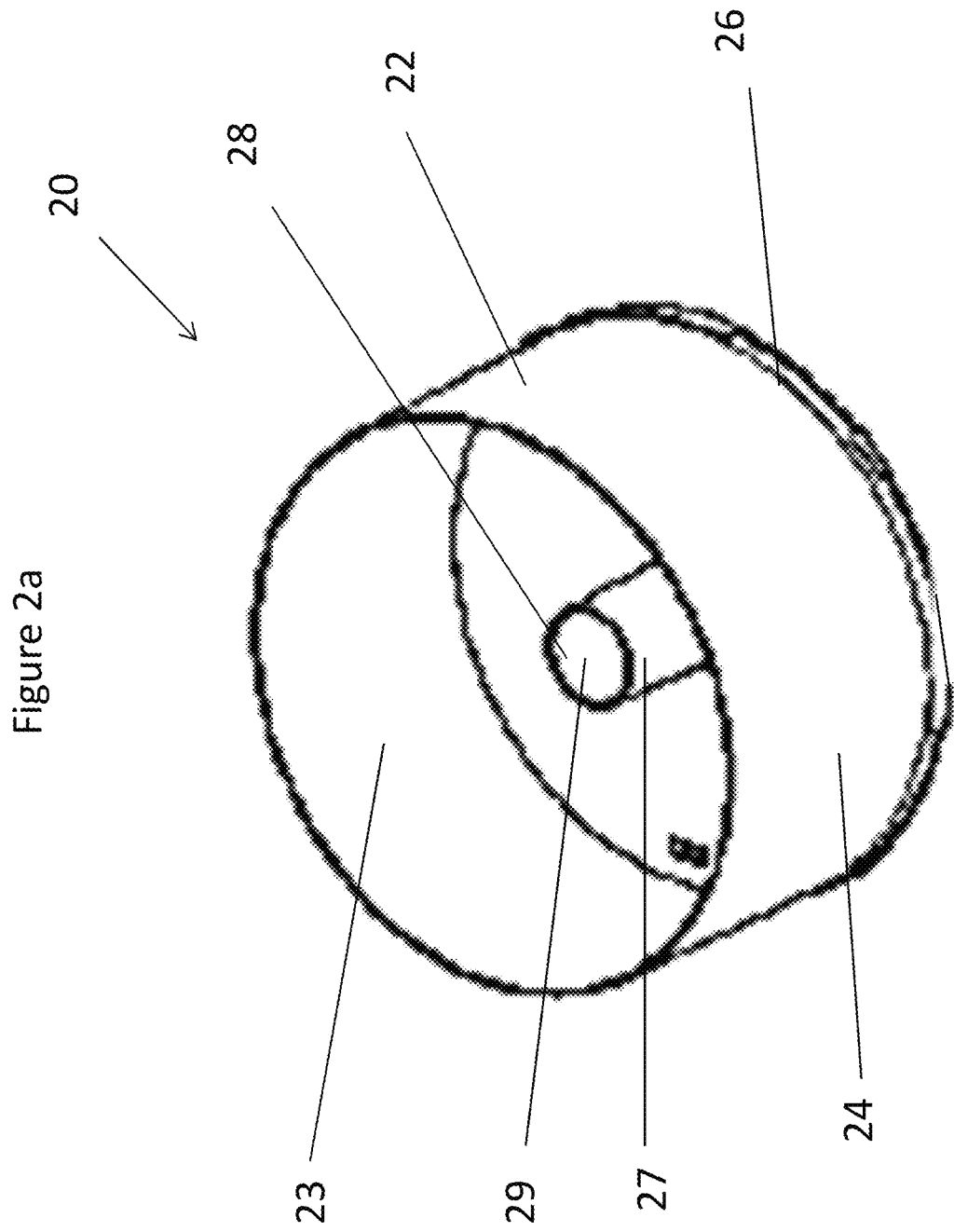
FIG. 2a provides a bottom perspective schematic view of a top of the rodent trap.
Figure 2B:
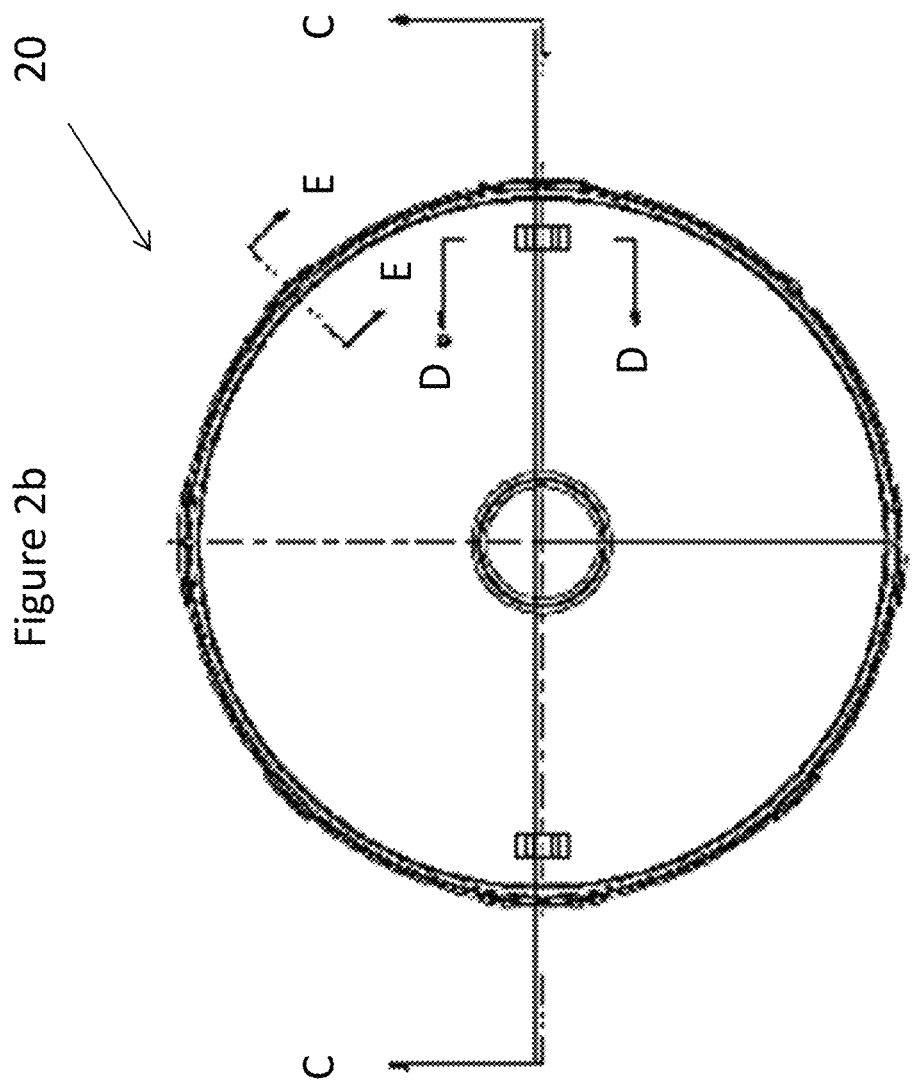
FIG. 2b provides a bottom view of the top of the rodent trap.
Figure 2C:
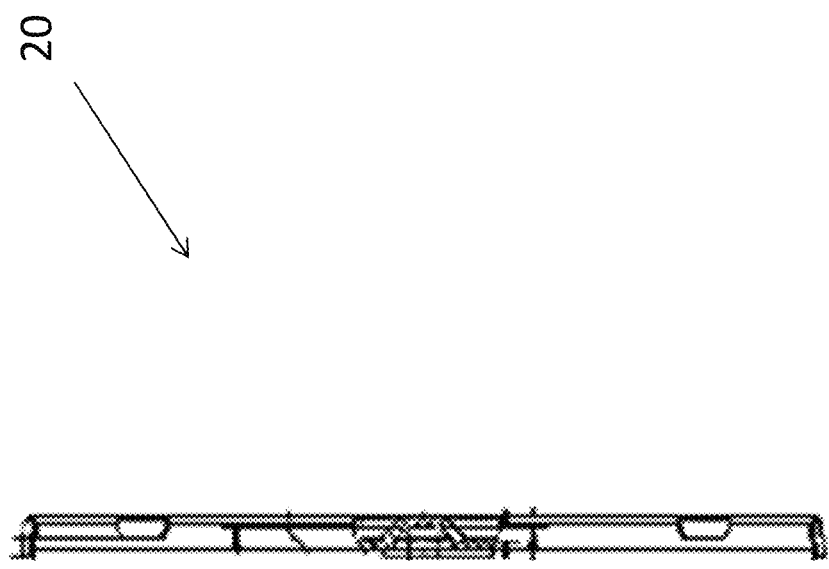
FIG. 2c provides a cross-sectional (section D-D) view of a handle attachment mechanism formed in the top of the rodent trap.
Figure 2D:
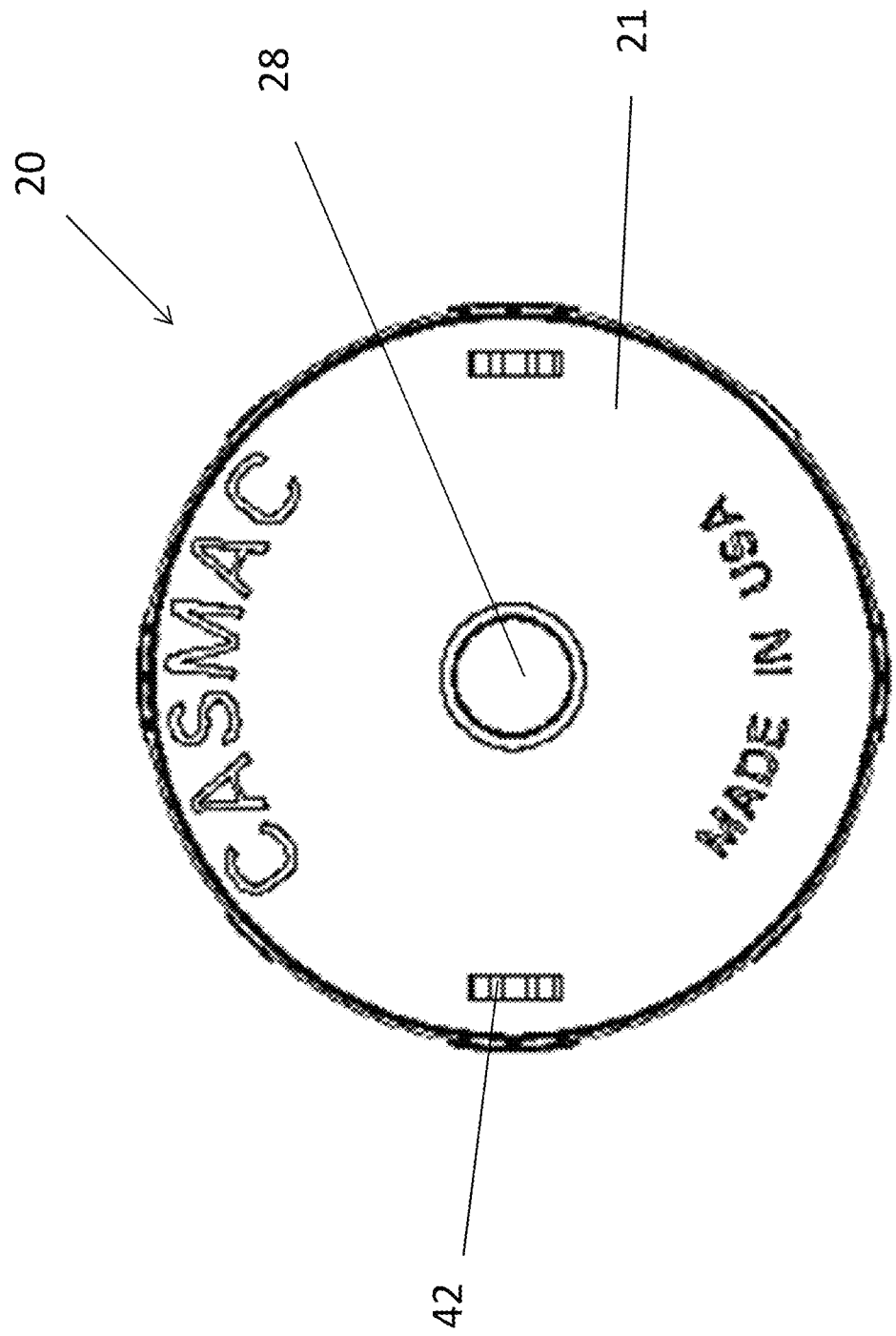
FIG. 2d provides a top view of the top of the rodent trap.
Figure 2F:
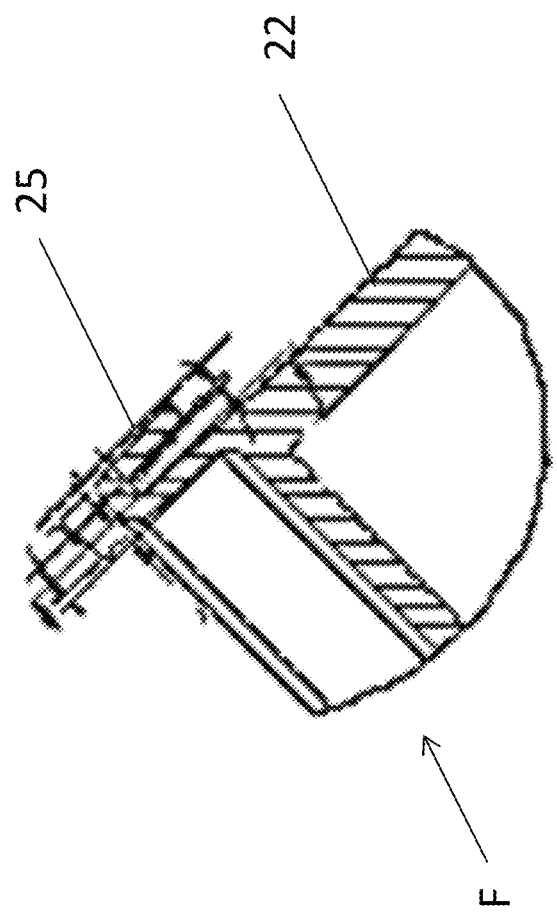
FIG. 2f provides an exploded view of the rim of the top of the rodent trap.
Figure 2G:
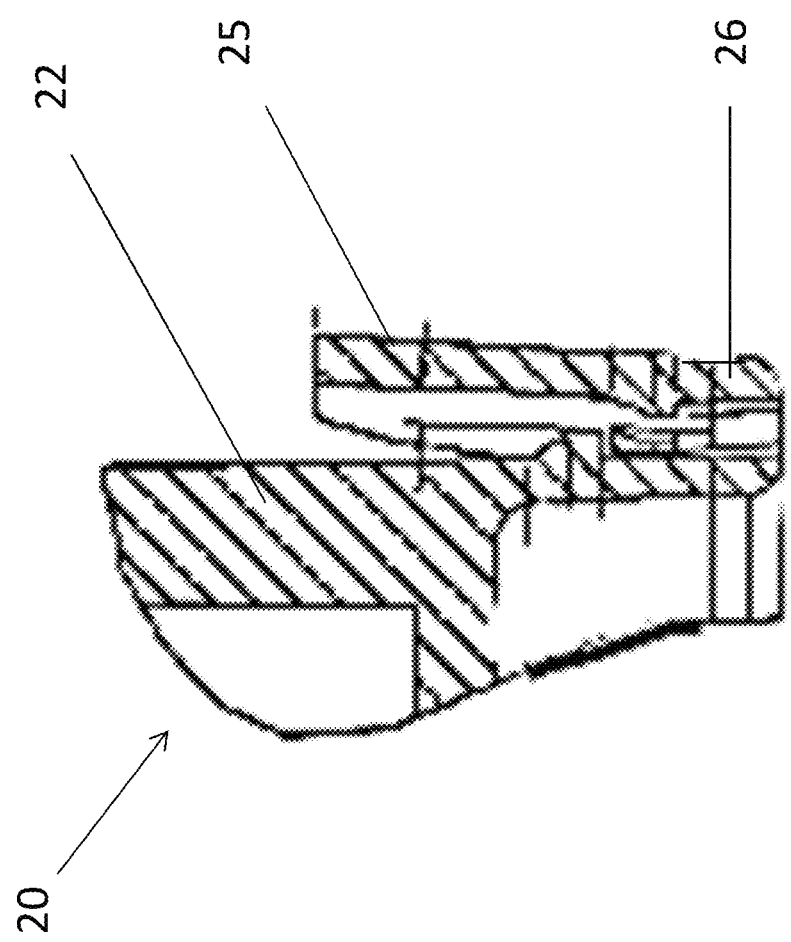
FIG. 2g provides an exploded view of a catch formed in the top of the rodent trap.
Figure 3A:
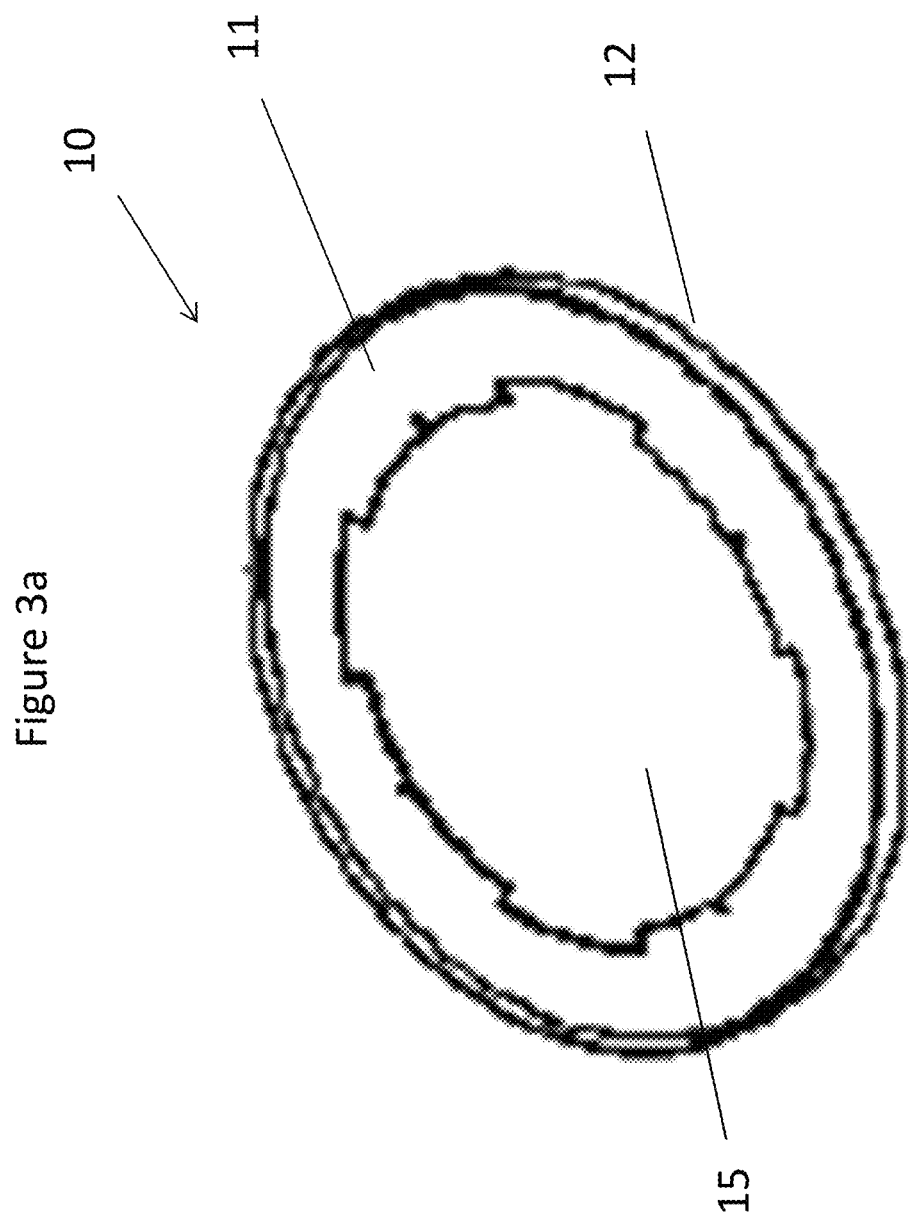
FIG. 3a illustrates a top perspective schematic view of a base of the rodent trap.
Figure 3B:
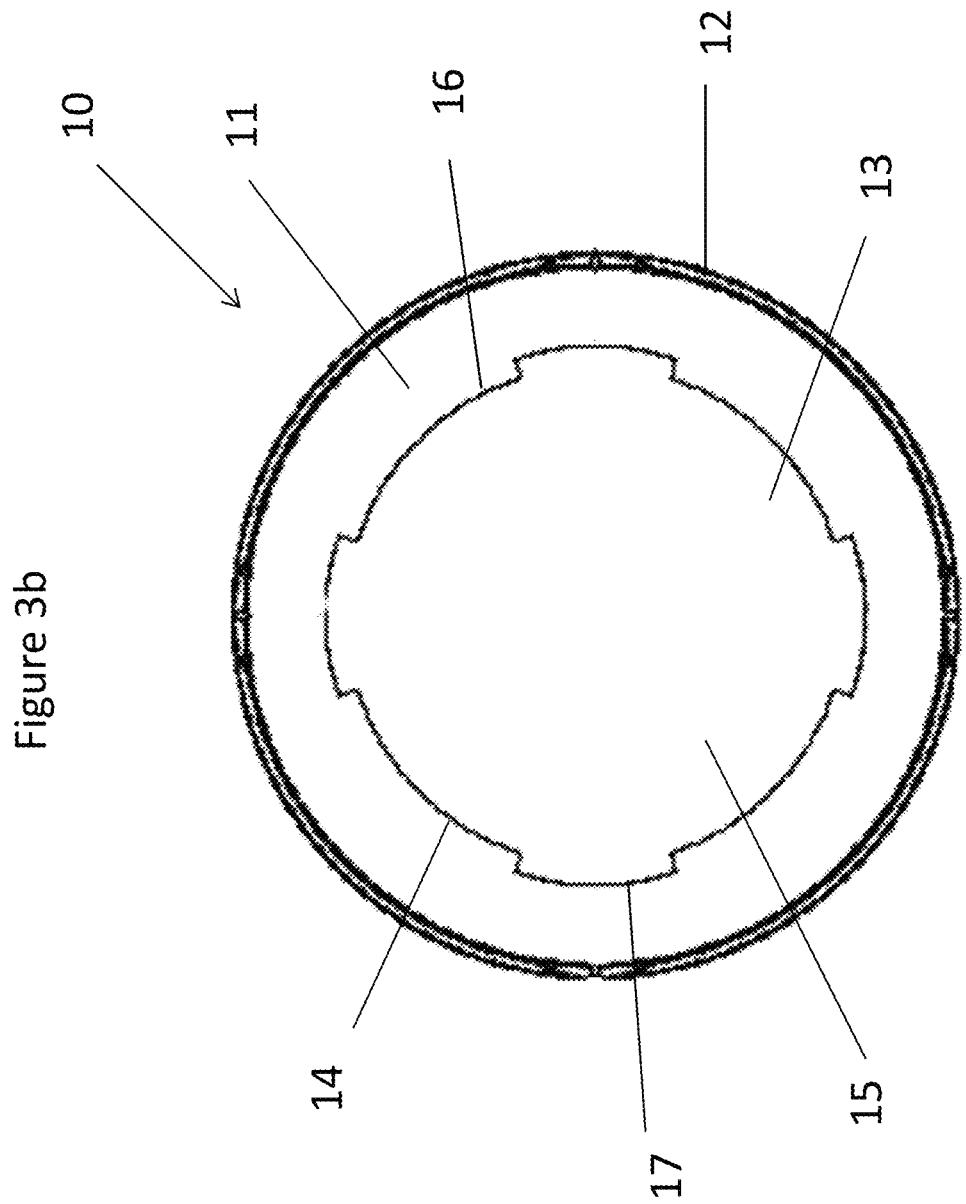
FIG. 3b provides a top view of the base of the rodent trap.
Figure 3D:
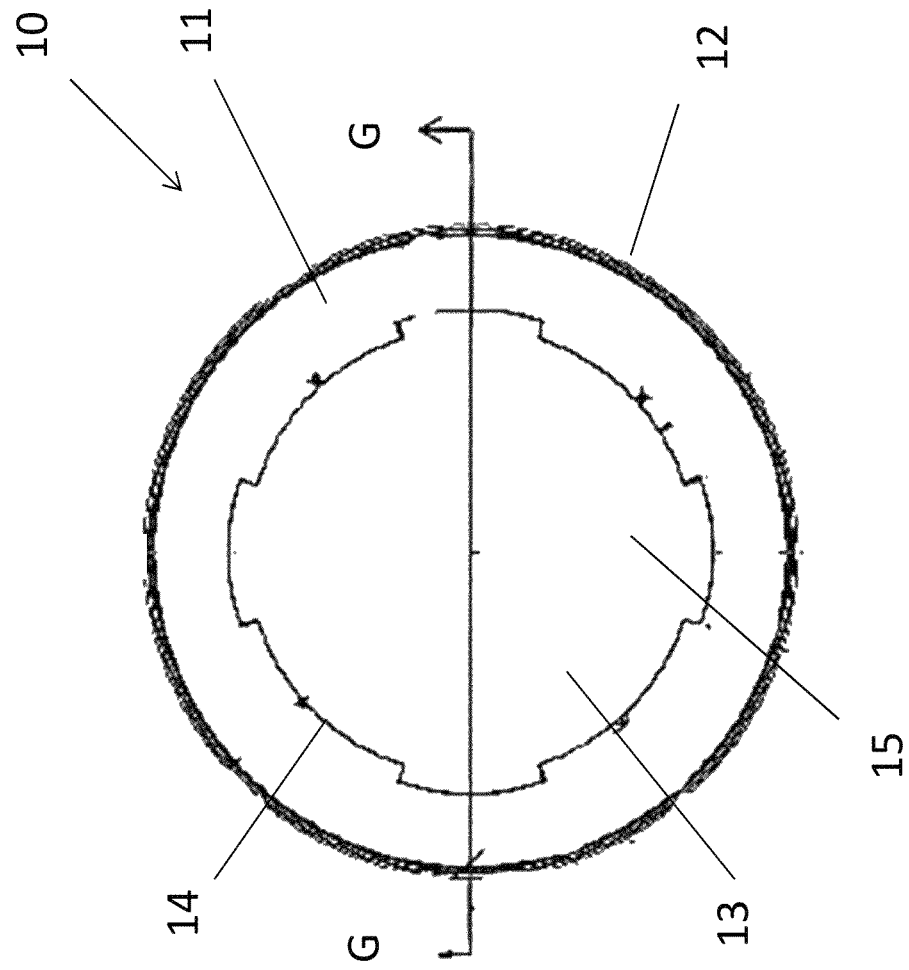
FIG. 3d provides a bottom view of the base of the rodent trap.
Figure 3F:
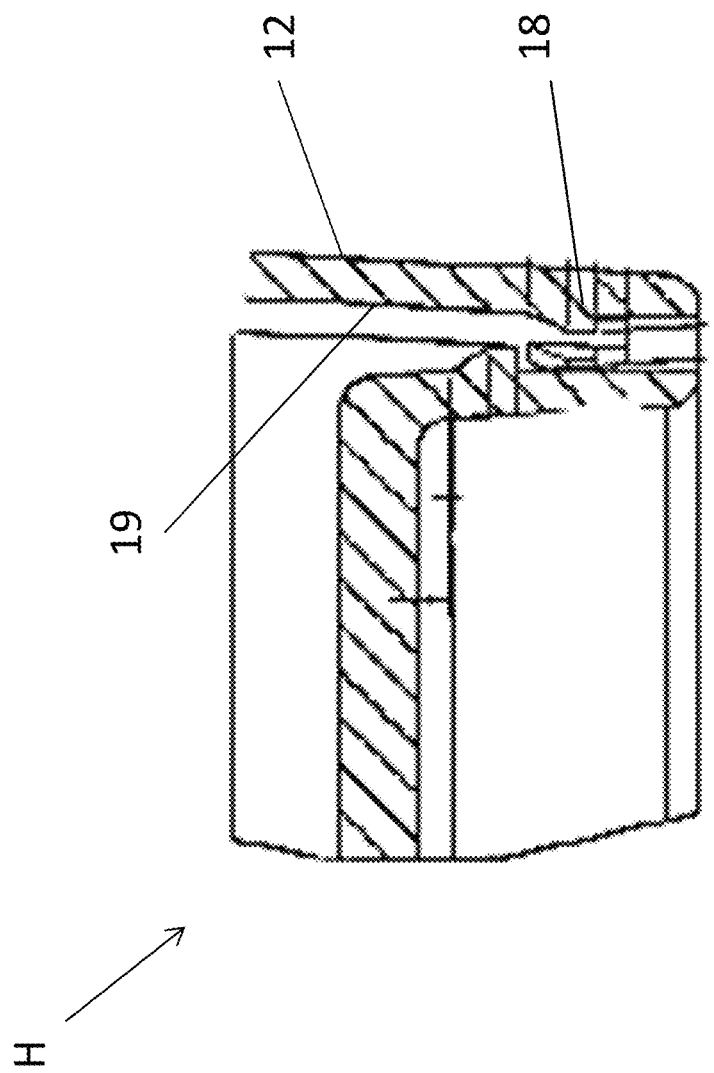
FIG. 3f provides an exploded view of a catch formed in the rim of the base of the rodent trap.

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention; therefore the drawings are not necessarily to scale. In addition, in the embodiments depicted herein, like reference numerals in the various drawings refer to identical or near identical structural elements.

The following description of the preferred embodiment(s) is merely exemplary in nature and is in no way intended to limit the invention, its application, or uses.

A rodent trap 100 is provided in FIGS. 1a-1d. The trap 100 has a base 10, a top 20 and a wire body 40 extending between the base and the top. As shown in FIGS. 3a-3f, the base 10 is formed from a solid material, for example plastic, metal or the like. A preferred plastic is high density polyethylene, known for its structural strength and durability.

The base includes a circular base panel 11 and a base rim 12 extending upward from a perimeter of the base panel. The base rim circumscribes the base panel and has a rim interior 19. A release door 13 is formed and centered in the base panel. The release door is formed as an opening 15 extending through the base panel. The release door is defined by an edge 14 extending around the release door. The edge includes alternating securing base rims 16 and securing base slots 17.

A bait tray 30 is shown in FIGS. 4a-4f, and is configured to be secured in the release door 13. The bait tray is circular and sized to the release door. An outer edge 31 of the bait tray includes alternating tray tabs 32 and securing tray rims 33. The tabs are positioned at a first height from the bottom of the bait tray and the securing rims are positioned at a second height from the bottom of the bait tray wherein the first height is greater than the second height. The tray tabs 32 are sized to fit through the base slots 17 formed in the edge of the release door. When the tray tabs 32 are inserted into the base slots 17 of the release door, the bait tray may be rotated using finger grips 34 formed in the bait tray. The bait tray is rotated so that the tabs of the bait tray are positioned above the securing rims of the release door and the securing rims of the bait tray are positioned below the securing rims of the release door. As such, the securing rims of the release door are secured between the tabs and the securing rims of the bait tray to secure the bait tray to the base.

When the bait tray 30 is secured to the base 10, the release door is sealed to retain rodents within the trap. When the bait tray is removed from the base the release door is opened to release rodents from the trap and/or to position bait in the bait tray.

The bait tray includes at least one cavity 35 for retaining bait. In the exemplary embodiment, the bait/water tray includes two cavities for retaining bait and for holding water. The bait may include food, water, or the like.

The cavities are an integral part of the bait tray. They can be formed by molding the bait tray to have an annular wall 36 and a bisecting barrier 37. These two components form two cavities that are integrated into the bait tray. This provides a way to make water and food available to the trapped rodent that cannot be spilled and lost. The cavities retain the bait in position to enhance a smell of the bait to attract rodents. The cavities also prevent the bait from spilling or being blown out of the trap. The cavities are sized to retain enough bait to keep multiple rodents alive for several days. Accordingly, the rodents that are captured may be released into the wild by removing the bait/water tray and opening the release door.

The bait tray can also have raised perches 38, located in the proximity of the cavities 35. These perches are designed to aid in feeding the trapped rodent, by providing easy access to food and water. The perches 38 can be molded so that the perches create indents on the bottom of the bait tray that work as finger grips 34 to assist in the rotation of the bait tray for removal.

The bait tray can be removed from the rodent trap, cleaned, dried and the cavities filled with bait and water. This can take place without having to reach inside a cage to access the food and/or water containers. Likewise the release of the rodent is accomplished by simply removing the bait tray. There is no need to reach inside a cage to remove a trapped rodent.

The wire body 40, shown in FIGS. 1a-1d, is secured to the base 10. In particular, the wire body is formed from a flat wire mesh that is rolled into a cylinder to form the wire body. By forming the wire body from a flat wire mesh, manufacturing costs and time may be reduced in comparison to known rodent traps that utilize wire mesh formed from more complicated shapes.

Figure 5:
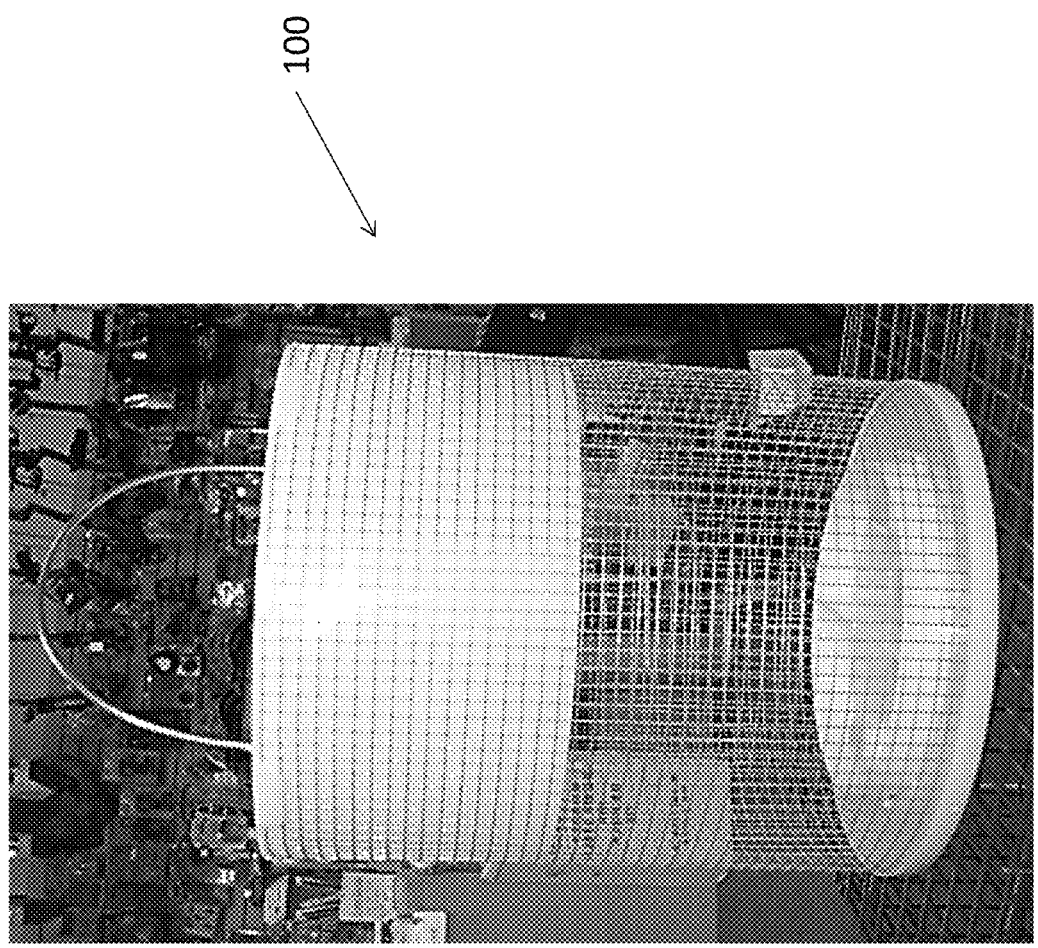
FIG. 5 is a side view of a rodent trap formed in accordance with an embodiment.
Figure 6:
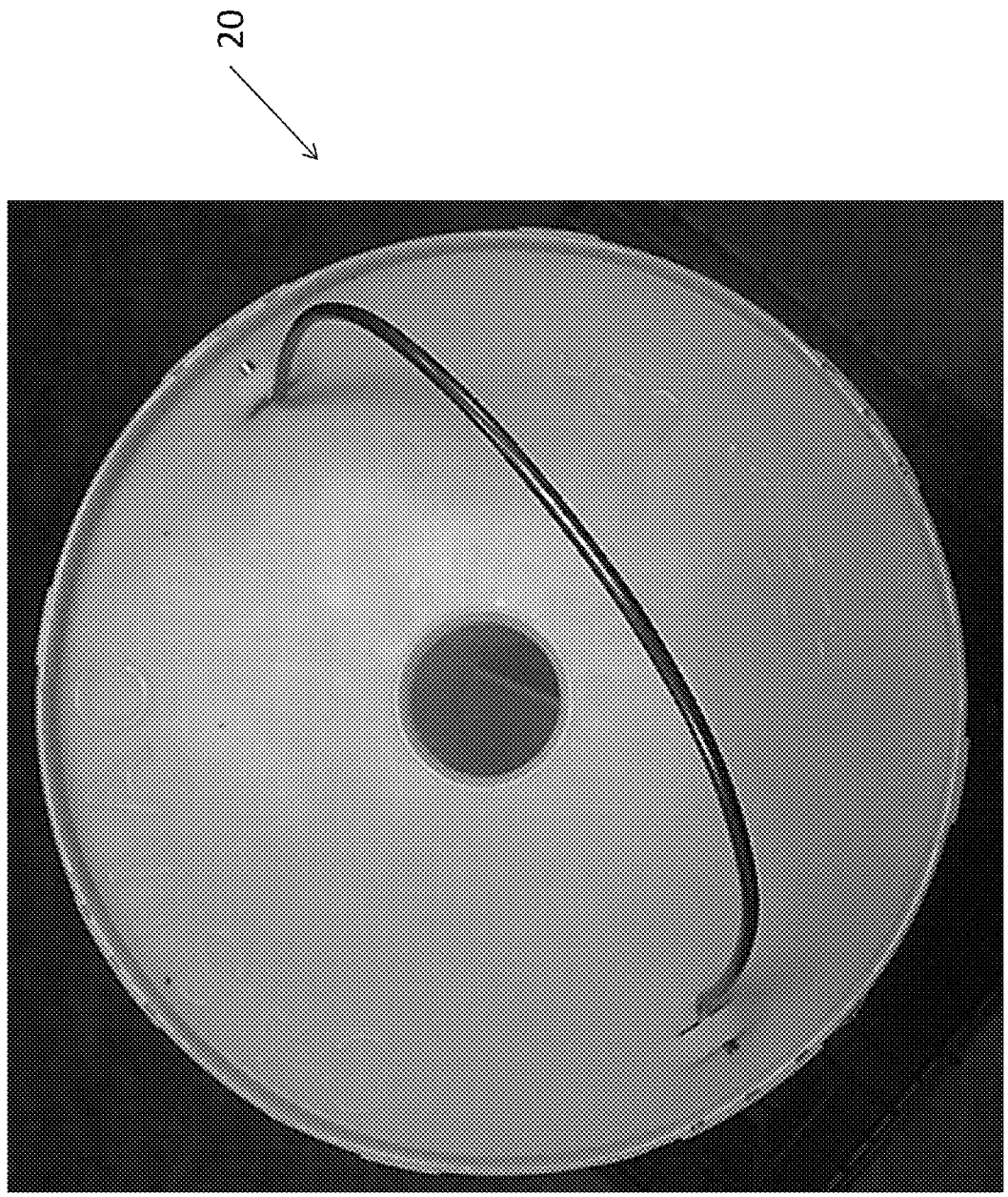
FIG. 6 is a top view of the rodent trap shown in FIG. 5.

As shown in FIG. 1d, the base includes an integrated catch 18 formed on the base rim interior 19. The catch is configured to receive the wire body 40. Particularly, the wire body snaps into the catch thereby easily coupling the wire body and the base without the need for tools or moving parts. As shown in FIG. 5, the wire body attaches to the base along the base rim interior so that the base rim 12 extends upward along a portion of the bottom of the wire body. The base rim 12 provides a barrier that prevents the rodent from chewing through the wire mesh to escape the rodent trap.

In a preferred embodiment, the wire body 40 forms a bottom half of the rodent trap. Accordingly, bait positioned within the bait trap is visible to the rodents. Additionally, the wire body allows airflow through the bottom half of the trap and over the bait. The airflow carries the scent of the bait to attract the rodents. Because the bait is positioned within the cavity of the bait trap, the bait does not become scattered or blow out of the trap because of the airflow. Moreover, the scent of the bait is more consistently emitted because the bait is condensed within the cavity.

Figure 7:
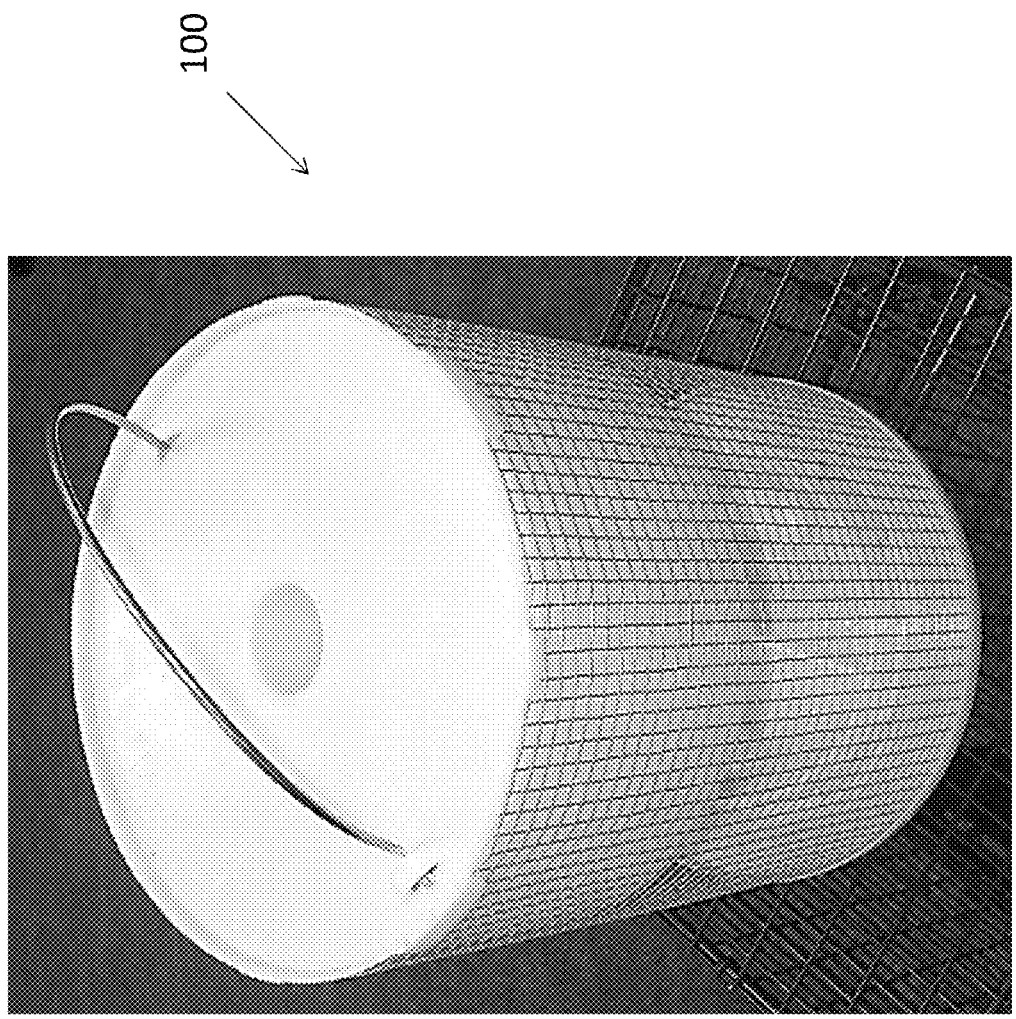
FIG. 7 is a top perspective view of the rodent trap shown in FIG. 5.
Figure 8:
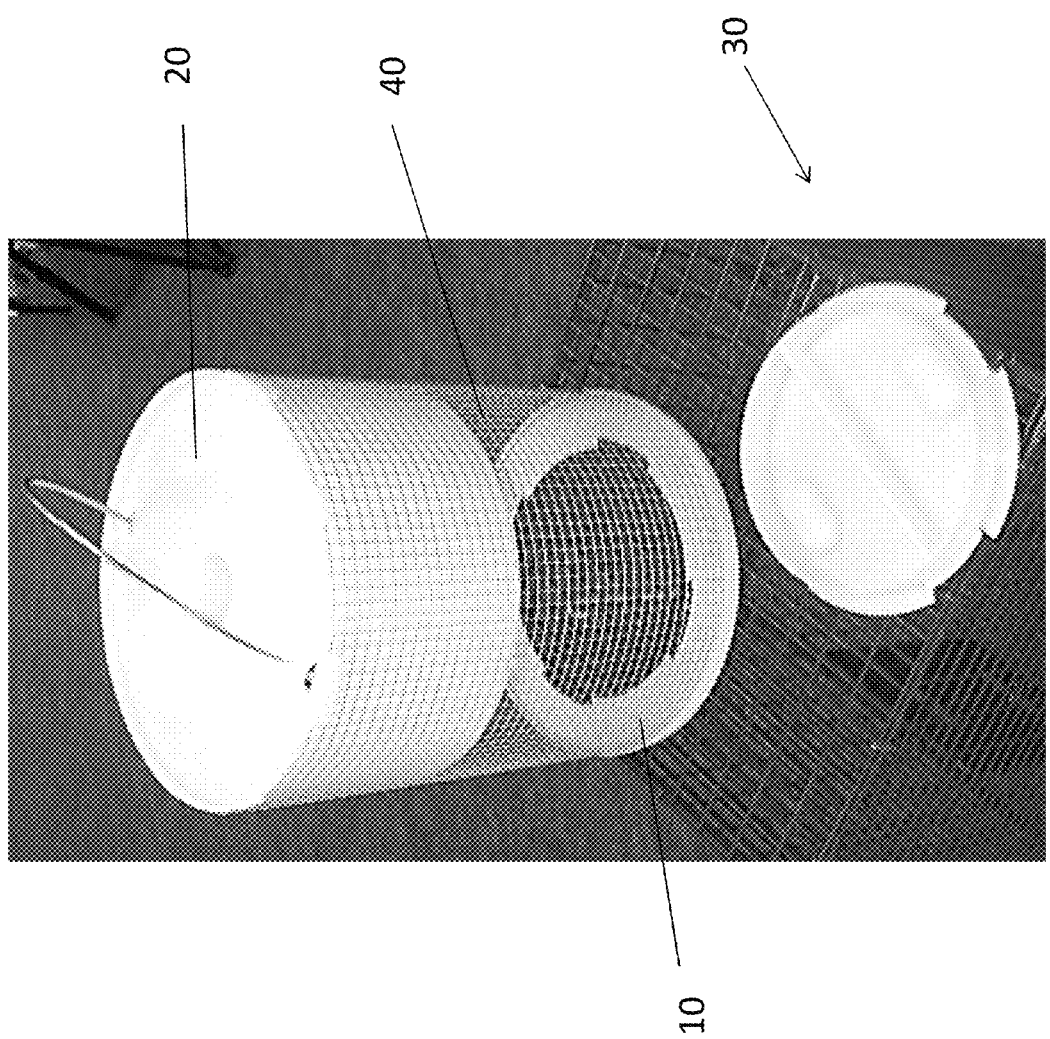
FIG. 8 is a top perspective view of the rodent trap shown in FIG. 5 and having the bait tray removed.
Figure 9:
FIG. 9 is a bottom perspective view of the rodent trap shown in FIG. 5 and having the bait tray removed.
Figure 10:
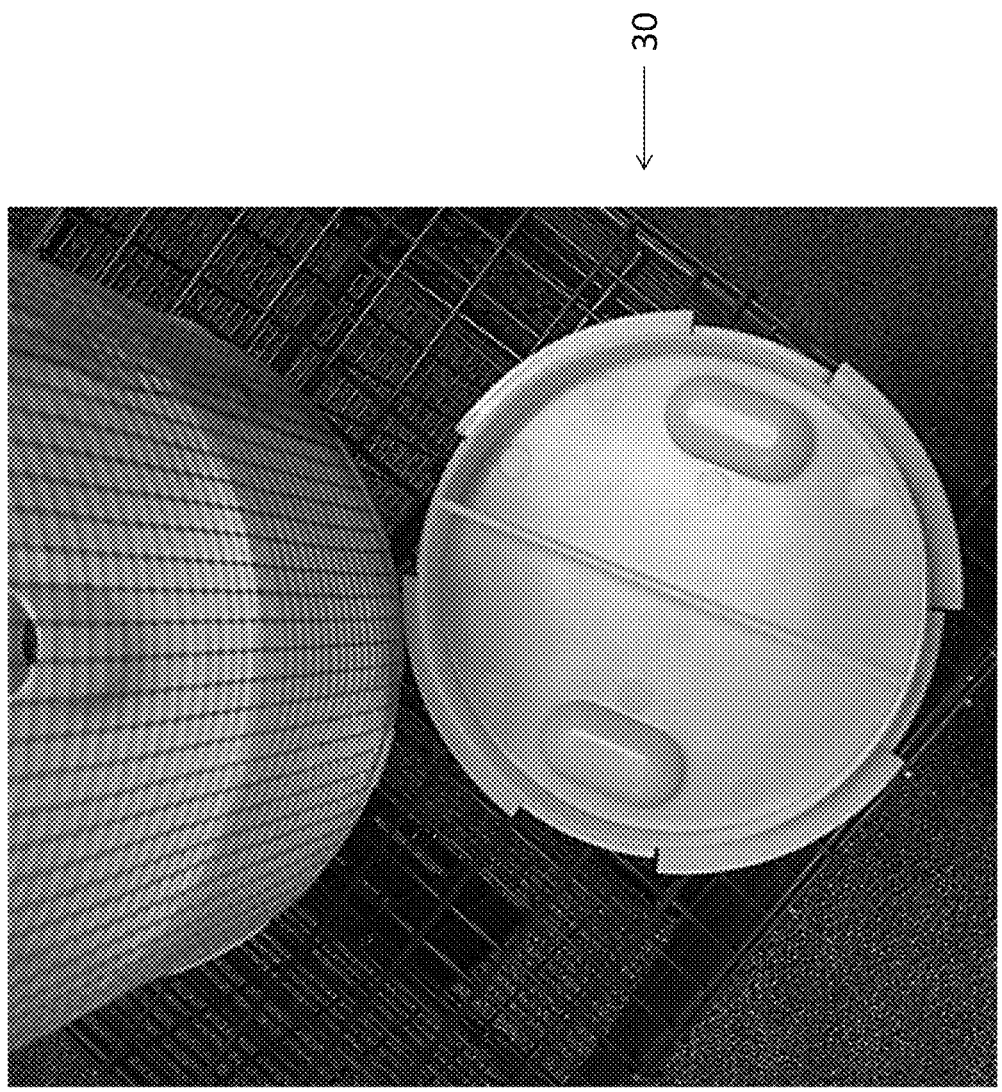
FIG. 10 is a top view of the bait tray.

The top 20 of the rodent trap is secured to the top of the wire body. As shown in FIGS. 2a-2g, the top includes a circular top panel 21 and a top flange 22 that extends downward perpendicularly from a perimeter 26 of the top panel. The flange 22 has an interior flange surface 23 and an exterior flange surface 24. The top catch 25 is integrally formed along the perimeter 26 of the top panel along the flange exterior 24. The top of the wire body snaps into the top catch 25 to attach the top of the rodent trap to the wire body without the need for tools or movable parts. As shown in FIG. 7, the top of the wire body is positioned along an exterior of the top flange 24 so that the top flange is positioned inside of the wire body.

In one embodiment, the top flange 22 extends downward by approximately half of the height of the rodent trap. In one embodiment, the trap may have a height of from about 8 to 20 inches. Preferably, the trap has a height of from about 8 to 12 inches. Most preferably, the height is approximately 10 inches and the flange may have a length of approximately 5 inches. Both the top panel and the flange can be formed from a solid opaque material, for example plastic that can be molded to provide a smooth surface that the rodent cannot climb on. An example of a suitable plastic is high density polyethylene. Accordingly, a top half of the trap is enclosed.

The enclosed top half of the trap provides security and protection for the rodents within the trap since most predators of the rodents attack the rodents from above. Since the top 20 is opaque, the rodent cannot look up and see the sky and trees, which are the source of many predators, such as hawks. Further the top shades the interior of the trap making the rodent feel sheltered. Unsheltered animals can feel stress to the point that they die from it. As such, the rodents are not only attracted to the bait within the trap, but also to the protection from predators that the trap provides. With an ample food and water supply within the trap and protection from predators within the trap, rodents will not only be attracted into the trap but will also be less likely to try to escape the trap.

A tube 27 extends from the top panel and extends approximately perpendicularly into the trap. The tube forms a tube opening 28 that extends from the top panel to a tube end 29. In one embodiment, the tube has a length that is less than the length of the top flange. It is estimated that mice cannot jump higher than about 6 inches, so the end of the tube should be at least about 6 inches from the bait tray. The tube can be cylindrical, or it can be conical. If conical, the narrow end extends downward. The tube opening is sized to receive a rodent therethrough. For example, the tube opening may have an inner diameter 41 between 1 and 2 inches. In an exemplary embodiment for catching mice the tube has a diameter of 1½ inches. The diameter of the tube is sized so that the rodent can climb down the tube into the trap but is incapable of jumping up out through the tube. Additionally, the tube end is spaced from the base of the trap so that the rodent cannot jump out of the tube from the base of the trap. Because the wire body is secured on the exterior of the top flange, the top half of the interior of the rodent trap is smooth plastic and the trapped rodent cannot find purchase climb through the tube. Further, the rodent cannot reach the upper edge of the wire body to chew on it and escape.

The top also includes handle attachment mechanisms 42 for securing a handle 43 to the rodent trap. The handle may be used to move the trap into the wilderness after rodents have been captured within the trap.

The present invention provides an integrated locking bait and water system designed into the base of the trap. By integrating the bait and water system into the bottom of the trap the odors from the bait/water are dispersed at the same level as the target rodent. Additionally, by having the top of the trap made of a solid material, as opposed to wire mesh, the top creates a covered area to provide a feeling of comfort and security to the captured rodent. The rodent will enter the trap as it is a secure/safe area to feed. Moreover, the circular design of the trap minimizes the raw materials for trap construction, and is much easier to assemble. The integrated catches in the top and bottom parts of the trap allow the trap to be assembled without any additional fastenings to secure the wire mesh to the those pieces, thereby allowing for a more simple trap assembly by snapping the trap together. Once the rodents are captured, the integrated water and bait system and the solid top of the trap allow the rodents to be kept in a stress free environment for those that wish to relocate the captured rodents.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A rodent trap comprising:
   a base having a base panel and a release door formed therein to release rodents from the trap, wherein the base panel is horizontally oriented;
   a bait tray having an integrally formed cavity extending downwardly for retaining bait, the bait tray being oriented in the horizontal arrangement and removably attached to the base, the release door being sealed when the bait tray is attached to the base, the release door being opened when the bait tray is removed from the base;
   a top having a top panel and tube with a tube opening extending through the top panel and the tube extending downward toward the release door in the base, the tube opening having a diameter sized to receive a rodent therethrough, wherein the top panel has a perimeter and a center and is horizontally oriented, wherein the tube is solid and is integrally formed with the top panel, and wherein the tube is located at the center of the top panel and is offset from the perimeter by a distance that is greater than the diameter of the tube; and a wire body extending vertically between the top and the base at the perimeter and enclosing an interior space, wherein finger grips are integrally formed in the bottom of the bait tray and extend upward into the bait tray in the interior space, and wherein the bait tray rotates within a horizontal plane in the release door between an opened position and a sealed position.

2. The rodent trap of claim 1, wherein the top is formed from a solid opaque material, wherein the top is substantially flat between the tube opening and the perimeter, wherein the bait tray contains a plurality of cavities with at least one cavity configured to hold food bait and another cavity configured to hold water, and wherein the bait tray is further comprised of a means for rotating the bait tray within the release door in a horizontal plane between an open position and a sealed position.

3. The rodent trap of claim 1, wherein the wire body is formed as a flat wire mesh that is rolled into a cylindrical tube to form the wire body.

4. The rodent trap of claim 3, wherein the top is further comprised of a flange around the perimeter, wherein the flange extends downward toward the base at a length greater than the length of the tube.

5. A rodent trap comprising:
a base having a base panel and a release door formed therein to release rodents from the trap, wherein the base panel is horizontally oriented;
a bait tray having an integrally formed cavity extending downwardly for retaining bait, the bait tray being oriented in the horizontal arrangement and removably attached to the base, the release door being sealed when the bait tray is attached to the base, the release door being opened when the bait tray is removed from the base;
a top having a top panel and tube with a tube opening extending through the top panel and the tube extending downward toward the release door in the base, the tube opening having a diameter sized to receive a rodent therethrough, wherein the top panel has a perimeter and a center and is horizontally oriented, wherein the tube is located at the center of the top panel and is offset from the perimeter by a distance that is greater than the diameter of the tube; and
a wire body extending vertically between the top and the base at the perimeter and enclosing an interior space, wherein the top includes a flange integrally formed from a solid opaque material with the top panel, the flange around the perimeter and extending downward toward the base, wherein the release door comprises an edge with a plurality of circumferentially spaced slots, wherein the edge extends inwardly from the perimeter toward the interior space, wherein the bait tray is further comprised of a plurality of circumferentially spaced tray tabs and a plurality of circumferentially spaced tray rims, wherein the circumferentially spaced tray tabs fit between the circumferentially spaced slots in a first position corresponding with opening the bait tray from the release door and rotate over the edge in a second position corresponding with sealing the bait tray to the release door, wherein the circumferentially spaced tray rims are under the edge in both the first position and the second position, and wherein the base includes a rim extending upwardly from the base panel toward the top.

6. The rodent trap of claim 5, wherein finger grips are integrally formed in the bottom of the bait tray, and wherein the bait tray rotates in the release door between an opened position and a sealed position.

7. The rodent trap of claim 5, wherein the wire body is formed as a flat wire mesh that is rolled into a cylindrical tube to form the wire body.

8. The rodent trap of claim 7, wherein the top is further comprised of a flange around the perimeter, wherein the flange extends downward toward the base at a length greater than the length of the tube.

9. A rodent trap comprising:
a base having a release door formed therein to release rodents from the trap;
a bait tray having an integrally formed cavity for retaining bait, the tray being removably attached to the base, wherein the bait tray contains a plurality of cavities with at least one cavity configured to hold food bait and another cavity configured to hold water, wherein the bait tray has a bottom side with finger grips, wherein the finger grips extend upward into the bait tray;
a top having a tube with a tube opening extending therethrough, the tube opening sized to receive a rodent therethrough; and
a wire body extending between the top and the base;
wherein the top has a circular top panel and a top flange;
wherein the top flange extends downward perpendicular to the top panel; and
wherein the top flange is about half of the height of the rodent trap.

10. The rodent trap of claim 9, wherein the tube is solid and is integrally formed with the top panel and extends downward from the top of the trap to a tube end positioned within the trap, the tube end spaced from the base and located above a lowest end of the top flange.

11. The rodent trap of claim 9, wherein the top is formed from a solid opaque material, wherein the tube is located at a center of the top panel and is offset from a perimeter of the top panel by a distance that is greater than a diameter of the tube opening.

12. The rodent trap of claim 9, wherein the bait tray is further comprised of a plurality of circumferentially spaced tray tabs fitting within the release door in a first position corresponding with opening the bait tray from the release door and engaging the release door in a second position corresponding with sealing the bait tray to the release door.

13. The rodent trap of claim 9, wherein the release door comprises an edge with a plurality of circumferentially spaced slots.

14. The rodent trap of claim 9, wherein the bait tray is further comprised of a plurality of circumferentially spaced tray rims under the edge.

15. A rodent trap comprising:
a base having a base panel and a release door formed therein to release rodents from the trap, wherein the base panel is horizontally oriented;
a bait tray having an integrally formed cavity for retaining bait, the tray being removably attached to the base;
a top having a circular top panel, a top flange, and a tube with a tube opening extending through the top panel and the tube extending downward toward the release door in the base, the tube opening having a diameter sized to receive a rodent therethrough, wherein the top has a perimeter and a center and is horizontally oriented, wherein the tube is located at the center of the top panel and is offset from the perimeter by a distance that is greater than the diameter of the tube; and a wire body extending vertically between the top and the base at the perimeter and enclosing an interior spaces; and wherein the base includes a rim extending upwardly from the base panel toward the top, wherein the release door comprises an edge with a plurality of circumferentially spaced slots wherein the edge extends inwardly from the perimeter toward the interior space, wherein the bait tray is further comprised of a plurality of circumferentially spaced tray tabs and a plurality of circumferentially spaced tray rims, wherein the circumferentially spaced tray tabs fit between the the release door and rotate over the edge in a second position corresponding with securing the bait tray to the release door, wherein the circumferentially spaced tray rims are under the edge in both the first position and the second position.

16. The rodent trap of claim 15, wherein the top flange extends downward from the perimeter perpendicular to the top panel; wherein the top flange is about half of the height of the rodent trap; and wherein the top is formed from a solid opaque material.

17. The rodent trap of claim 16, wherein the wire body is formed as a flat wire mesh that is rolled into a cylindrical tube to form the wire body.

18. The rodent trap of claim 15, wherein the top is substantially flat and includes a handle with a pair of attachments connected to the top panel proximal to the perimeter on opposite sides of the tube opening.

19. The rodent trap of claim 15, wherein the tube is solid and is integrally formed with the top panel.

20. The rodent trap of claim 15, wherein the flange extends downward toward the base at a length greater than the length of the tube.

* * * * *